US009035179B2

(12) United States Patent
Matsumoto et al.

(10) Patent No.: US 9,035,179 B2
(45) Date of Patent: May 19, 2015

(54) FUSE BOX

(75) Inventors: Yusuke Matsumoto, Makinohara (JP); Miyuki Fukunaga, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 39 days.

(21) Appl. No.: 14/000,230

(22) PCT Filed: Feb. 21, 2012

(86) PCT No.: PCT/JP2012/001159
§ 371 (c)(1),
(2), (4) Date: Aug. 19, 2013

(87) PCT Pub. No.: WO2012/114723
PCT Pub. Date: Aug. 30, 2012

(65) Prior Publication Data

US 2013/0327567 A1 Dec. 12, 2013

(30) Foreign Application Priority Data

Feb. 23, 2011 (JP) ................................ 2011-036985

(51) Int. Cl.
*H02G 3/14* (2006.01)
*H01H 71/02* (2006.01)
*H01H 85/175* (2006.01)
*H01H 85/20* (2006.01)
(Continued)

(52) U.S. Cl.
CPC ............. *H01H 71/02* (2013.01); *H01H 85/175* (2013.01); *H01H 85/2045* (2013.01); *H01H 85/044* (2013.01); *H01H 2085/025* (2013.01)

(58) Field of Classification Search
CPC . H01H 71/02; H01H 85/175; H01H 85/2045; H01H 85/044
USPC ............... 174/66, 67; 361/833; 220/241, 242; 439/136
See application file for complete search history.

(56) References Cited

U.S. PATENT DOCUMENTS 5,576,516 A 11/1996 Kameyama et al.
5,594,403 A * 1/1997 Taga et al. .................... 337/186
(Continued)

FOREIGN PATENT DOCUMENTS

CN 101032061 A 9/2007
EP 1056157 A2 11/2000
(Continued)

OTHER PUBLICATIONS

Chinese office action letter issued on Dec. 31, 2014 in the counterpart Chinese patent application.

*Primary Examiner* — Dhirubhai R Patel
(74) *Attorney, Agent, or Firm* — Marvin A. Motsenbocker; Mots Law, PLLC

(57) ABSTRACT

A locking portion (13) is provided to lock an open/close cover (15) to a fuse unit (5) or a cover main body (9) assembled to the fuse unit (5) in a state where the open/close cover (15) is closed. The open/close cover (15) is openably and closably connected to the cover main body (9), and includes first and second side walls (17, 19) respectively on both end sides in an orthogonal direction orthogonal to an opening/closing direction and extending in the opening/closing direction. The locking portion (13) includes a locking protrusion (21) provided in the first side wall (17) deformable in the orthogonal direction, and a mating locking protrusion (23) provided in the fuse unit (5) or the cover main body (9) and facing the first side wall (17).

1 Claim, 5 Drawing Sheets

(51) Int. Cl.
*H01H 85/044* (2006.01)
*H01H 85/02* (2006.01)

(56) References Cited

U.S. PATENT DOCUMENTS

| | | | | |
|---|---|---|---|---|
| 7,686,661 | B2 * | 3/2010 | Shrum et al. | 439/781 |
| 8,633,385 | B2 * | 1/2014 | Korcz et al. | 174/67 |
| 8,913,371 | B2 * | 12/2014 | Depp et al. | 361/626 |
| 2002/0134572 | A1 | 9/2002 | Matsumura | |
| 2002/0168566 | A1 | 11/2002 | Ohtsuka et al. | |
| 2009/0111316 | A1 | 4/2009 | Matsumoto et al. | |

FOREIGN PATENT DOCUMENTS

| | | | |
|---|---|---|---|
| EP | 1071163 | A2 | 1/2001 |
| EP | 1239506 | A2 | 9/2002 |
| JP | 2002-270082 | A | 9/2002 |

* cited by examiner

FUSE BOX

TECHNICAL FIELD

The present invention relates to a fuse box.

BACKGROUND ART

As a fuse box of the related art, one is known which includes a fuse unit and a protection cover being a cover body covering the fuse unit, the fuse unit housing a fuse element provided with fuse bodies configured to interrupt a circuit in response to an overcurrent (see Patent Literature 1).

In the fuse box, the protection cover has a fixed cover being a cover main body assembled to the fuse unit and an opening/closing cover being an open/close cover openably and closably connected to the fixed cover via a hinge. The opening/closing cover of the protection cover is provided with a locking protrusion. The locking protrusion engages with a recess provided in the fuse unit and a closed state of the opening/closing cover with respect to the fuse unit is thereby maintained.

Such an opening/closing cover of the fuse box is provided with a guide rib in addition to the locking protrusion. The guide rib is guided into a guide groove provided in the fuse unit and the movement of the opening/closing cover in a closing direction with respect to the fuse unit is thereby guided. Thus, even when the hinge breaks, the opening/closing cover can be assembled to the fuse unit.

CITATION LIST

Patent Literature

[PTL 1] Japanese Unexamined Patent Application Publication No. 2002-270082

SUMMARY OF INVENTION

In such fuse box as described above, the locking protrusions and the recesses constitute locking portions. The locking portions are provided in both side walls of the open/close cover which are located in a direction orthogonal to the opening/closing direction of the open/close cover and in portions of the fuse unit which correspond to both side walls of the open/close cover.

However, depending on the size of the fuse box, there may be a case where a disposable space between neighboring members is limited and the locking portion cannot be provided in both side walls of the open/close cover and in the portions of the fuse unit which correspond to both side walls of the open/close cover.

In such case, it is conceivable to simply provide the locking portion in one side wall of the open/close cover and in a portion of the fuse unit which corresponds to the one side wall of the open/close cover. However, the locking portion is provided only at one position in this configuration and a holding force of holding the open/close cover is thereby greatly reduced. Moreover, it is conceivable to provide multiple locking portions in one side wall of the open/close cover. However, the structure of the locking portions is complicated in this configuration.

An object of the present invention is to provide a fuse box capable of maintaining a holding force of a locking portion with a simple structure.

An aspect of the present invention is a fuse box comprising: a fuse unit configured to house a fuse element provided with a fuse body for interrupting a circuit in response to an overcurrent; a cover body configured to cover the fuse unit, the cover body including a cover main body assembled to the fuse unit and an open/close cover openably and closably connected to the cover main body via a hinge; and a locking portion configured to lock the open/close cover to the fuse unit or the cover main body in a state where the open/close cover is closed, wherein the open/close cover includes side walls respectively on both end sides thereof in an orthogonal direction orthogonal to an opening/closing direction of the open/close cover, the side walls extending in the opening/closing direction, a first side wall of the side walls is deformable in the orthogonal direction, the locking portion includes a locking protrusion provided in the first side wall, and a mating locking protrusion provided in the fuse unit or the cover main body and facing the first side wall, the locking protrusion and the mating locking protrusion are locked to and released from each other by deformation of the first side wall, and the fuse unit or the cover main body facing a second side wall of the side walls has a restriction wall configured to be in contact with the second side wall during locking of the locking protrusion to the mating locking protrusion.

In the aspect described above, the locking portion is provided in the deformable first side wall and in the fuse unit or the cover main body facing the first side wall, and includes the locking protrusion and the mating locking protrusion which are locked to and released from each other by the deformation of the first side wall. Accordingly, the locking and release of the locking portion (locking protrusion and mating locking protrusion) can be performed easily by opening and closing operations of the open/close cover.

Moreover, the fuse unit or the cover main body facing the second side wall is provided with the restriction wall configured to be in contact with the second side wall from the time of locking to the time of releasing the locking portion (locking protrusion and the mating locking protrusion). Accordingly, the movement of the open/close cover is restricted in the direction orthogonal to the opening/closing direction when the open/close cover is closed. Thus, the release of the locking portion due to the movement of the open/close cover in the orthogonal direction can be prevented.

Accordingly, even when the locking portion is provided only in the first side wall, the release of the locking portion is prevented by the contact between the second side wall and the restriction wall. Thus, the holding force of the locking portion can be maintained with a simple structure.

Moreover, the open/close cover is opened and closed while being guided in the opening/closing direction by the contact between the second side wall and the restriction wall from the time of locking to the time of releasing the locking portion. This suppresses the occurrence of twisting in the hinge and the durability of the hinge can be thereby improved.

DESCRIPTION OF EMBODIMENTS

Figure 1:
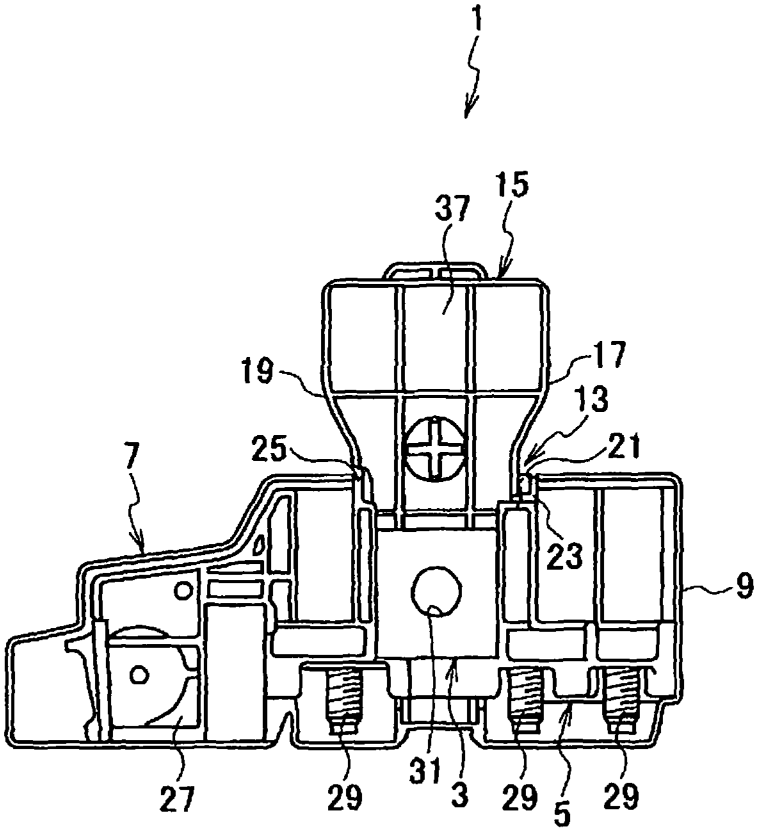
FIG. 1 is a bottom view of a fuse box of an embodiment of the present invention.

A fuse box 1 of an embodiment of the present invention is described based on FIG. 1 to FIG. 5C.

The fuse box 1 of the embodiment includes a fuse unit 5 and a cover body 7 configured to cover the fuse unit 5, the fuse unit 5 configured to house a fuse element 3 provided with fuse body (not shown) configured to interrupt a circuit in response to an overcurrent.

The cover body 7 has a cover main body 9 assembled to the fuse unit 5 and a open/close cover 15 openably and closably connected to the cover main body 9 via a hinge 11 and configured to be locked to the fuse unit 5 in a closed state via a locking portion 13.

Side walls 17 and 19 extending in an opening/closing direction of the open/close cover 15 are provided respectively on both end sides of the open/close cover 15 in a direction orthogonal to the opening/closing direction. One side wall (first side wall) 17 is provided to be deformable in the orthogonal direction. The locking portion 13 is provided in the one side wall 17 and in the fuse unit 5 facing the one side wall 17. The locking portion 13 includes a locking protrusion 21 and a mating locking protrusion 23 which are locked to and released from each other by the deformation of the one side wall 17. The fuse unit 5 facing the other side wall (second side wall) 19 is provided with a restriction wall 25 configured to be in contact with the other side wall 19 from the time of locking to releasing the locking protrusion 21 and the mating locking protrusion 23 of the locking portion 13 to and from each other.

Figure 2A:
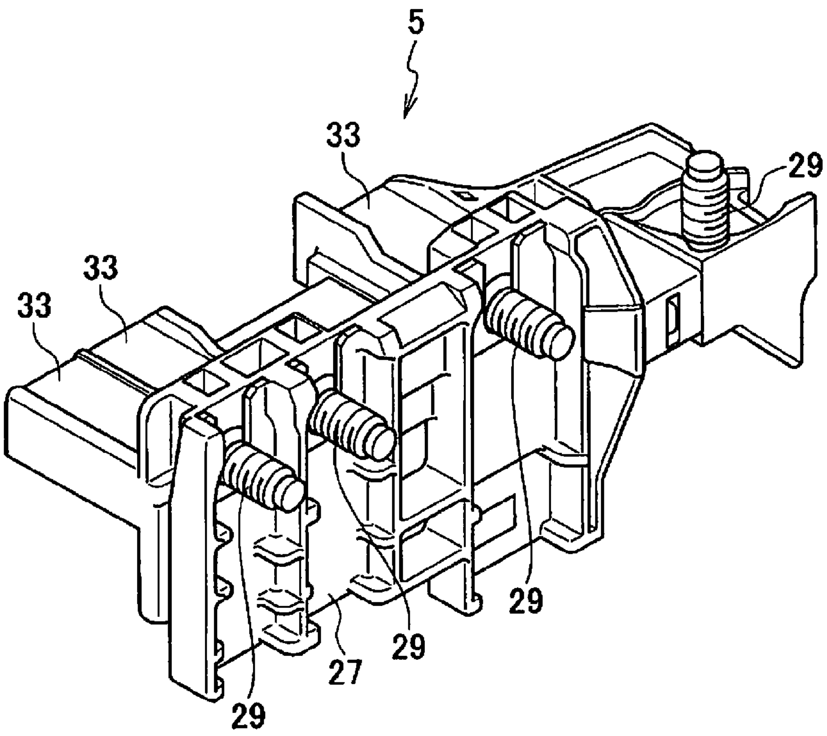
FIG. 2A is a perspective view of a fuse unit in the fuse box of the embodiment of the present invention.
Figure 2B:
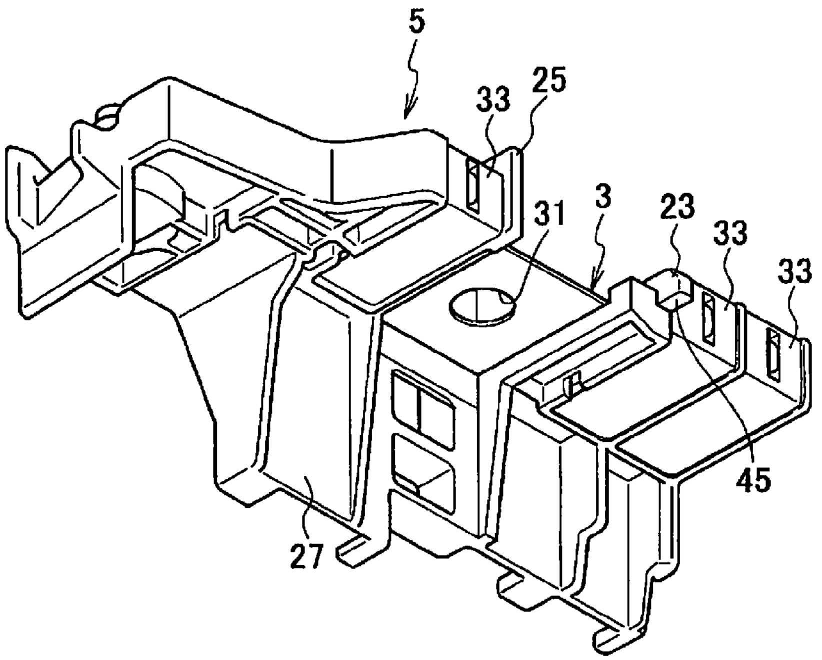
FIG. 2B is a perspective view of the fuse unit of FIG. 2A viewed from the opposite side.
Figure 3A:
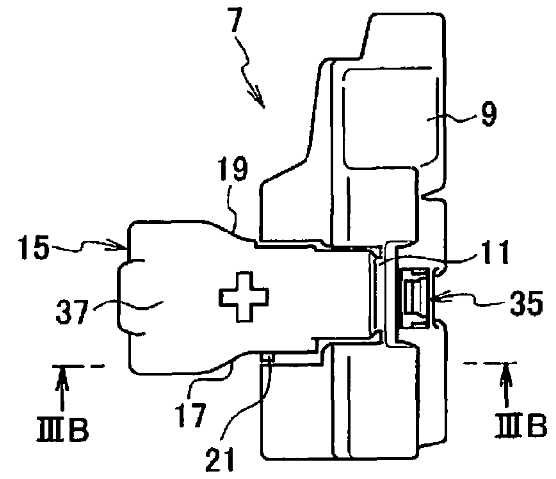
FIG. 3A is a top view of a cover body in the fuse box of the embodiment of the present invention.
Figure 3B:
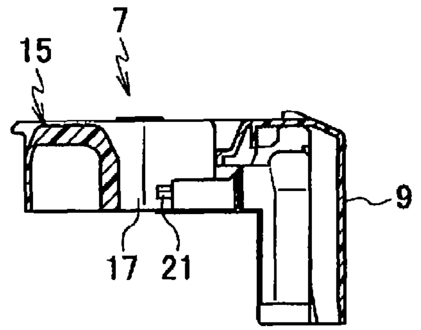
FIG. 3B is a cross-sectional view taken along the line IIIB-IIIB of FIG. 3A.
Figure 3C:
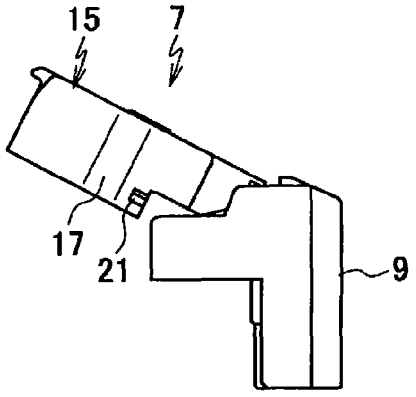
FIG. 3C is a side view of the cover body of FIG. 3A.
Figure 3D:
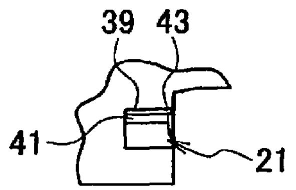
FIG. 3D is an enlarged view of a locking protrusion in the fuse box of the embodiment of the present invention.

As shown in FIGS. 2A and 2B, the fuse unit 5 includes the fuse element 3 and a fuse block 27. The fuse element 3 is made of a conductive plate material and is provided with the fuse bodies in multiple portions, the fuse bodies configured to interrupt the circuit by fusing in response to the overcurrent. The fuse element 3 is insert-molded in the fuse block 27 and multiple bolts 29 which protrude to the outside of the fuse block 27 and which serve as connection portions are electrically connected to the fuse element 3.

The fuse block 27 is made of an insulating resin material and is disposed, for example, in a battery (not shown) mounted in a vehicle. The multiple bolts 29 are exposed to the outside of the fuse block 27 and serve as the connection portions. A portion of the fuse element 3 exposed from the fuse block 27 serves as a battery connection portion 31 configured to be connected to the battery. Element covers 33 configured to protect the fuse bodies are assembled respectively to portions of the fuse block 27 where the fuse bodies of the fuse element 3 are located. The cover body 7 is attached to the fuse unit 5 described above.

As shown in FIGS. 3A to 3D, the cover body 7 is made of an insulating resin material and includes the cover main body 9 and the open/close cover 15. As shown in FIG. 1, the cover main body 9 is assembled to the fuse block 27 via a removable fixing unit 35 such as an engagement protrusion, in such a way as to cover the multiple bolts 29 exposed from the fuse block 27 of the fuse unit 5. The open/close cover 15 is openably and closably connected to the cover main body 9 via the hinge 11.

As shown in FIGS. 3A to 3D, the open/close cover 15 includes a base 37 and both side walls of the one side wall 17 and the other side wall 19. The base 37 has its end portion openably and closably connected to the cover main body 9 via the hinge 11. As shown in FIG. 1, in the state where the open/close cover 15 is closed, a portion of the base 37 on a side of the hinge 11 covers the battery connection portion 31 of the fuse element 3 and a portion of the base 37 on a free end side, which is formed to be wide, covers a battery post (not illustrated) of the battery. Both side walls of the one side wall 17 and the other side wall 19 are provided as a single member continuous with the base 37, respectively on both end sides of the base 37 in the orthogonal direction (width direction) which is orthogonal to the opening/closing direction of the open/close cover 15.

The both side walls including the one side wall 17 and the other side wall 19 are arranged to face each other with the battery connection portion 31 therebetween and extend in the opening/closing direction of the open/close cover 15. The both side walls 17 and 19 are formed to have thin walls and are provided to be deformable in the orthogonal direction which is orthogonal to the opening/closing direction of the open/close cover 15. Alternatively, it is possible to make only the one side wall 17 deformable and make the other side wall 19 rigid to suppress the deformation by forming the other side wall 19 to have a thick wall. The locking portion 13 is provided between the one side wall 17 and the fuse unit 5 facing the one side wall 17 while the restriction wall 25 is provided in the fuse unit 5 facing the other side wall 19.

As shown in FIGS. 1 to 5C, the locking portion 13 includes the locking protrusion 21 protruding from the one side wall 17 toward the outside and the mating locking protrusion 23 provided at a position corresponding to the locking protrusion 21 in the state where the open/close cover 15 of the fuse unit 5 is closed. As shown in FIG. 3D and FIG. 4B, the locking protrusion 21 is provided with inclined surfaces 39 and 41 which are inclined downward toward the opening/closing direction of the open/close cover 15. An end portion of the locking protrusion 21 on a side of the inclined surface 39 serves as a locking surface 43. As shown in FIG. 2B, the mating locking protrusion 23 is provided to protrude from a side surface of the fuse block 27 and a lower surface side of the mating locking protrusion 23 serves as a mating locking surface 45 to which the locking surface 43 of the locking protrusion 21 is to be locked. In the locking portion 13, when the open/close cover 15 changes from the opened state to the closed state, the inclined surface 41 of the locking protrusion 21 is brought into contact with the mating locking protrusion 23, the locking protrusion 21 rides over the mating locking protrusion 23 with the one side wall 17 being deformed, and the locking surface 43 of the locking protrusion 21 is locked to the mating locking surface 45 of the mating locking protrusion 23. In the locking portion 13, when the open/close cover 15 changes from the closed state to the opened state, the inclined surface 39 of the locking protrusion 21 is brought into contact with the mating locking protrusion 23 and the locking protrusion 21 rides over the mating locking protrusion 23 with the one side wall 17 being deformed. The restriction wall 25 is provided in the fuse unit 5 facing the other side wall 19 to make the locking of the locking portion 13 more rigid.

Figure 4A:
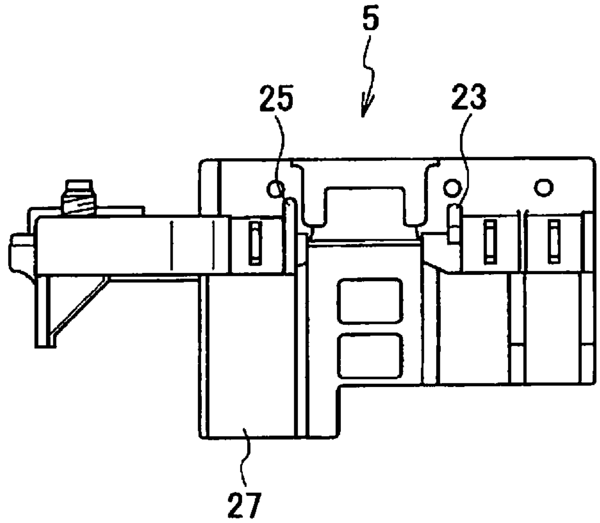
FIG. 4A is a front view of the fuse unit in the fuse box of the embodiment of the present invention.
Figure 4B:
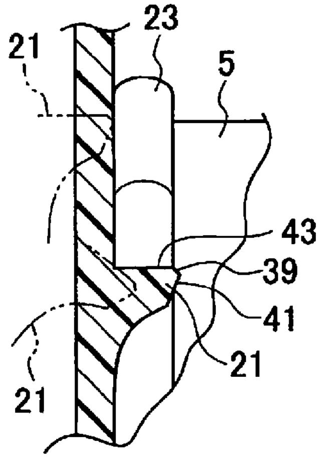
FIG. 4B is an enlarged view of the locking protrusion and a mating locking protrusion in the fuse box of the embodiment of the present invention.

As shown in FIG. 4A, the restriction wall 25 is provided to protrude from the upper surface of the fuse block 27. The protruding height of the restriction wall 25 is set such that the restriction wall 25 is capable of being in contact with the other side wall 19 from the time of locking to the time of releasing the locking portion 13. When the open/close cover 15 changes from the closed state to the open state, the restriction wall 25 is constantly in contact with the other side wall 19 from the time of locking to the time of releasing the locking portion 13. Thus, in the state where the open/close cover 15 is closed, the base 37 of the open/close cover 15 cannot move toward the restriction wall 25 and the one side wall 17 thereby does not move toward the restriction wall 25. Accordingly, the locking between the locking surface 43 of the locking protrusion 21 and the mating locking surface 45 of the mating locking protrusion 23 can be prevented from being released in the locking portion 13. Since the restriction wall 25 and the other side wall 19 are constantly in contact with each other from the time of locking to the time of releasing the locking portion 13, the movement of the open/close cover 15 in the opening/closing direction can be guided. Hence, it is possible to suppress rocking of the open/close cover 15 during the opening and closing operations of the open/close cover 15, and to improve the durability of the hinge 11 by suppressing the twisting of the hinge 11. In the open/close cover 15 of FIG. 5B, the open/close cover 15 is slightly twisted in the state where the restriction wall 25 and the other side wall 19 are in contact with each other. This twisting occurs since the other side wall 19 is provided to be deformable, as similar to the one side wall 17. The twisting can be eliminated by increasing the rigidity of the other side wall 19.

Figure 4C:
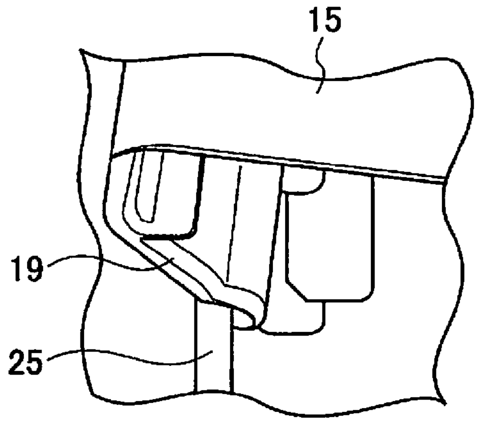
FIG. 4C is an enlarged view of another side wall and a restriction wall in the fuse box of the embodiment of the present invention.
Figure 5A:
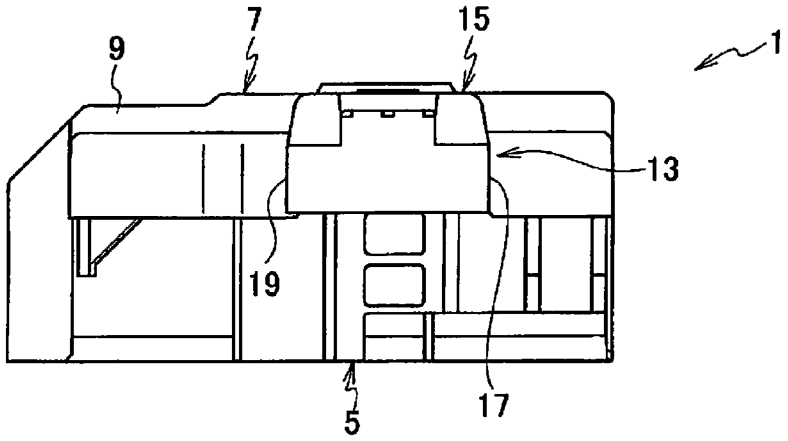
FIG. 5A is a front view of the fuse box of the embodiment of the present invention, in the state where an open/close cover is closed.
Figure 5B:
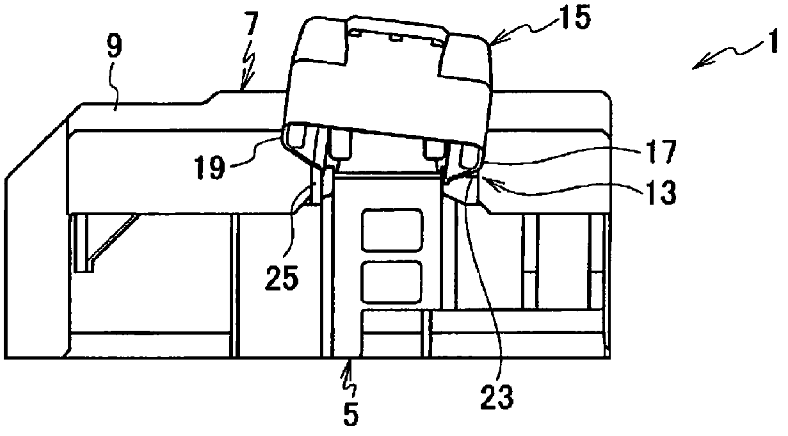
FIG. 5B is a front view at the time when the open/close cover is moved in an opening direction from the state of FIG. 5A.
Figure 5C:
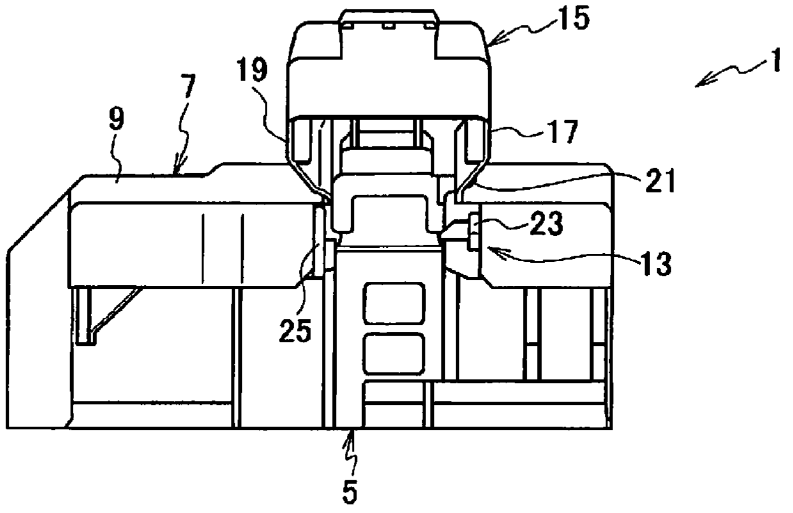
FIG. 5C is a front view at the time when the open/close cover is moved in the opening direction from the state of FIG. 5B.

The open/close cover 15 of the fuse box 1 configured as described above changes from the closed state to the open state as shown in FIGS. 5A to 5C. Specifically, the state shown in FIG. 5A where the locking surface 43 of the locking protrusion 21 of the locking portion 13 and the mating locking surface 45 of the mating locking protrusion 23 are locked to each other changes to the state shown in FIG. 5B where the one side wall 17 is deformed and the locking protrusion 21 of the locking portion 13 rides over the mating locking protrusion 23. At this time, as shown in FIG. 4C and FIG. 5B, the other side wall 19 is in contact with the restriction wall 25 and the twisting of the open/close cover 15 is suppressed. Then, as shown in FIG. 5C, the locking between the locking protrusion 21 of the locking portion 13 and the mating locking protrusion 23 is released and the open/close cover 15 can be moved in the opening direction.

In the fuse box 1 as described above, the locking portion 13 includes the locking protrusion 21 and the mating locking protrusion 23 which are provided respectively in the deformable one side wall 17 and the fuse unit 5 facing the one side wall 17 and which are locked to and released from each other by the deformation of the one side wall 17. This enables the locking and release of the locking portion 13 (locking protrusion 21 and mating locking protrusion 23) to be performed easily by the opening and closing operations of the open/close cover 15.

The fuse unit 5 facing the other side wall 19 is provided with the restriction wall 25 in contact with the other side wall 19 from the time of locking to the time of releasing the locking portion 13. This restricts the movement of the open/close cover 15 in the direction orthogonal to the opening/closing direction in the state where the open/close cover 15 is closed, and the release of the locking portion 13 caused by the movement of the open/close cover 15 in the orthogonal direction is thereby prevented.

Accordingly, even in the case where the locking protrusion 21 of the locking portion 13 is provided only in the one side wall 17, the release of the locking portion 13 is prevented by the contact between the other side wall 19 and the restriction wall 25. Thus, the holding force of the locking portion 13 can be maintained with a simple structure.

The open/close cover 15 is opened and closed while being guided in the opening/closing direction by the contact between the other side wall 19 and the restriction wall 25 during the period from the from the time of locking to the time of releasing the locking portion 13. This suppresses the occurrence of twisting in the hinge 11 and the durability of the hinge 11 can be thereby improved.

Note that, in the fuse box 1 of the embodiment of the present invention, the mating locking protrusion 23 of the locking portion 13 and the restriction wall 25 are provided in the fuse unit 5. However, the mating locking protrusion 23 of the locking portion 13 and the restriction wall 25 may be provided in the cover main body 9. Alternatively, it is possible to provide one of the mating locking protrusion 23 and the restriction wall 25 in one of the fuse unit 5 and the cover main body 9. For example, it is possible to provide the mating locking protrusion 23 of the locking portion 13 in the fuse unit 5 and provide the restriction wall 25 in the cover main body 9.

When the mating locking protrusion 23 of the locking portion 13 and the restriction wall 25 are provided in the cover main body 9, it is possible to provide the locking function of the open/close cover 15 only in the cover main body 9. Accordingly, the design of only the cover main body 9 needs to be changed and the freedom of design of the fuse box 1 is improved.

The fuse box 1 has been described above based on the embodiment illustrated in the drawings. However, the invention is not limited to the embodiment, and the configuration of parts can be replaced with any configuration having the similar function.

The invention claimed is:

1. A fuse box comprising:

a fuse unit configured to house a fuse element provided with a fuse body for interrupting a circuit in response to an overcurrent;

a cover body configured to cover the fuse unit, the cover body including a cover main body assembled to the fuse unit and an open/close cover openably and closably connected to the cover main body via a hinge; and a locking portion configured to lock the open/close cover to the fuse unit or the cover main body in a state where the open/close cover is closed, wherein the open/close cover includes side walls respectively on both end sides thereof in an orthogonal direction orthogonal to an opening/closing direction of the open/close cover, the side walls extending in the opening/closing direction, a first side wall of the side walls is deformable in the orthogonal direction, the locking portion includes a locking protrusion provided in the first side wall, and a mating locking protrusion provided in the fuse unit or the cover main body and facing the first side wall, the locking protrusion and the mating locking protrusion are locked to and released from each other by deformation of the first side wall, and the fuse unit or the cover main body facing a second side wall of the side walls has a restriction wall configured to be in contact with the second side wall during locking of the locking protrusion to the mating locking protrusion.

* * * * *